United States Patent [19]
Codde

[11] Patent Number: 5,097,942
[45] Date of Patent: Mar. 24, 1992

[54] MULTI-DROP CONTAINER DISCHARGE SYSTEM

[75] Inventor: Christopher L. Codde, Madera, Calif.

[73] Assignee: FMC Corporation, Chicago, Ill.

[21] Appl. No.: 595,520

[22] Filed: Oct. 11, 1990

[51] Int. Cl.⁵ .......................................... B65G 47/19
[52] U.S. Cl. ................................ 198/534; 198/432; 198/484.1; 99/360
[58] Field of Search ............... 198/432, 484.1, 534, 198/803.13; 99/360

[56] References Cited

U.S. PATENT DOCUMENTS

| | | | |
|---|---|---|---|
| 1,913,947 | 6/1933 | Otto | 198/432 |
| 3,543,908 | 12/1970 | Holland | 198/803.13 |
| 3,670,863 | 6/1972 | Meier et al. | 198/803.13 |
| 3,724,644 | 4/1973 | Reimers | 198/803.13 |

FOREIGN PATENT DOCUMENTS 1465350 3/1989 U.S.S.R. ........................ 198/484.1

*Primary Examiner*—Joseph E. Valenza
*Attorney, Agent, or Firm*—A. J. Moore; R. C. Kamp; R. B. Megley

[57] ABSTRACT

A multi-drop container discharge system receives frangible containers from carriers of an articulating hydrostatic cooker and discharges the containers into carriers of an intermittently driven indexing conveyor. Free fall of the frangible containers is minimized by first delaying free-fall from the hydrostatic cooker carriers and thereafter preventing free-fall to the bottom of the truncated V-shaped carriers of an indexing conveyor.

9 Claims, 2 Drawing Sheets

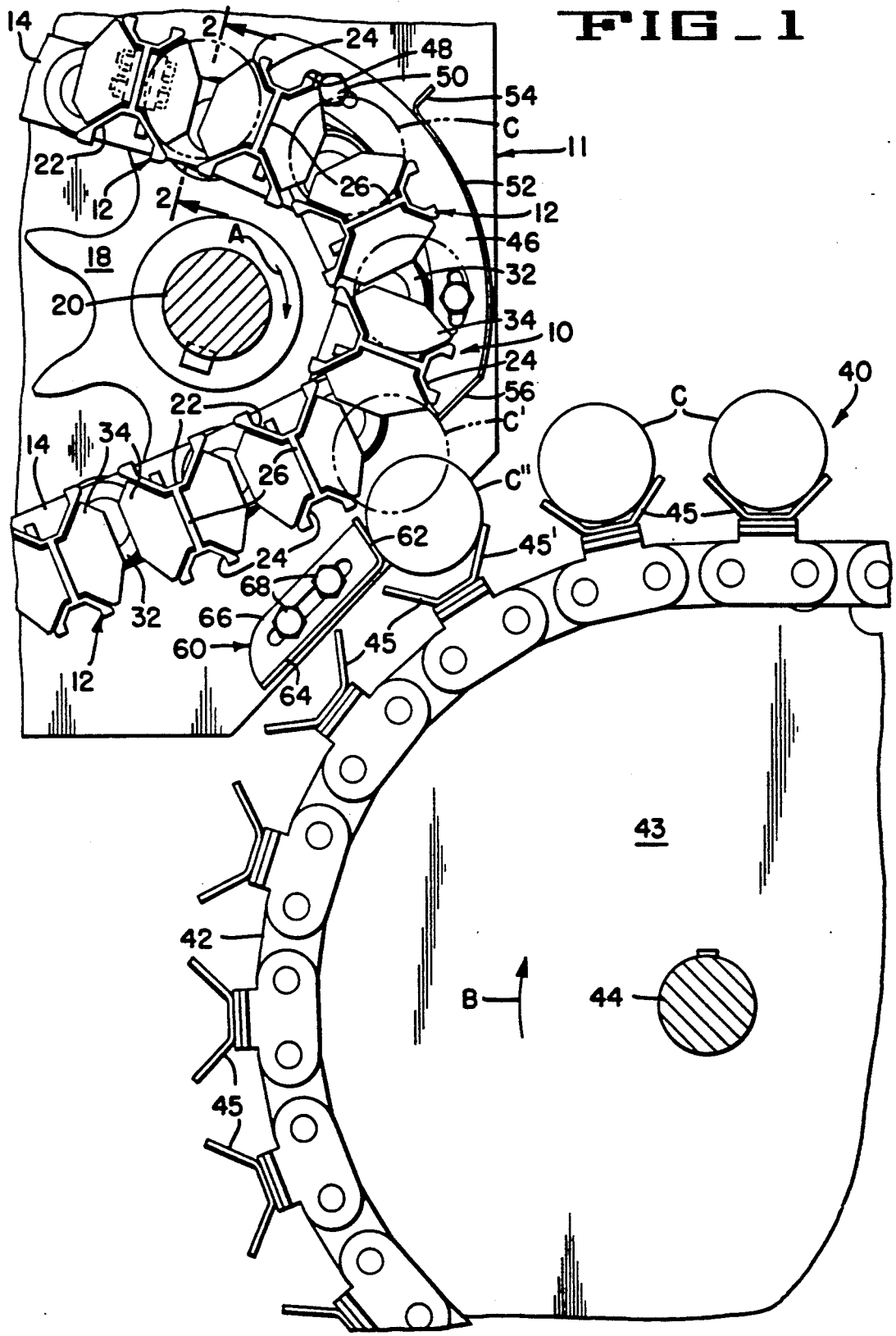

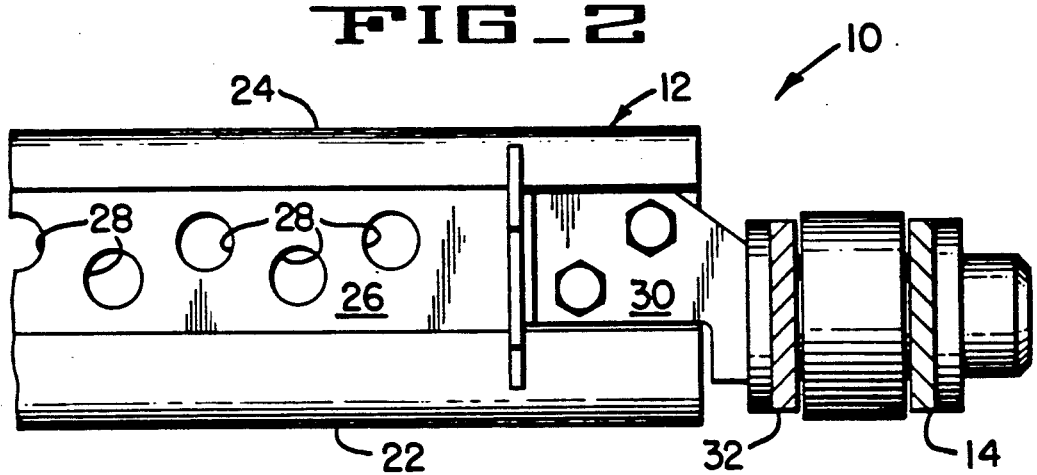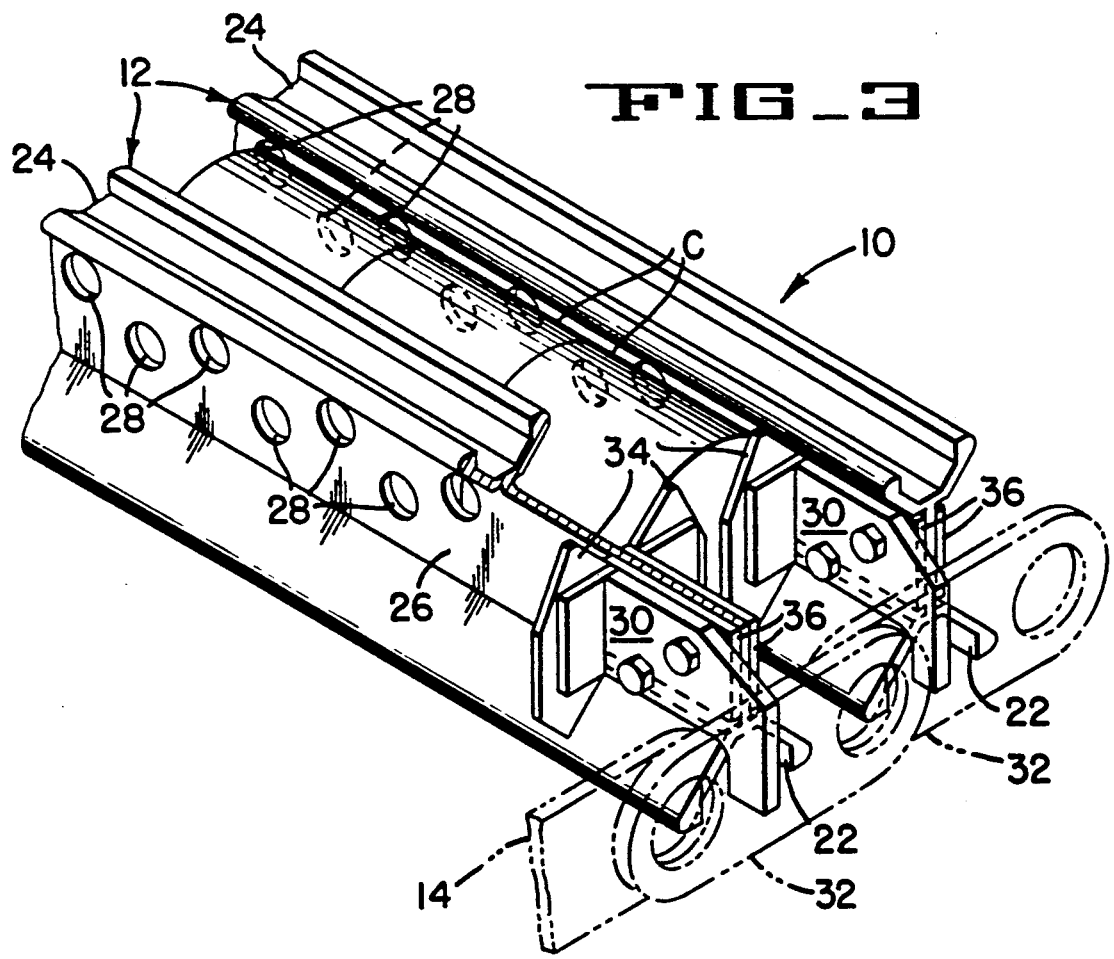

MULTI-DROP CONTAINER DISCHARGE SYSTEM

BACKGROUND OF THE INVENTION

1. Field of the Invention

The present invention relates to method and apparatus for gently transferring containers such as glass baby food jars from a hydrostatic cooker to carriers on an indexing conveyor thereby preventing damage to the containers.

2. Description of the Prior Art

Assignee's Lee U.S. Pat. No. 3,286,619 discloses a conventional double chain hydrostatic cooker for sterilizing and thereafter cooling containers.

SUMMARY OF THE INVENTION

The present invention relates to method and apparatus for gently transferring containers such as frangible glass jars from hydrostatic cooker bars as they rotate about small diameter discharge sprockets. An arcuate, adjustable guide cooperates to control the release of the containers from the open hydrostatic cooker bars and also cooperates with the movement of an indexing conveyor for providing a gentle multi-drop system thus preventing breakage of frangible containers.

BRIEF DESCRIPTION OF THE DRAWINGS

FIG. 1 is a vertical section taken through a discharge portion of a hydrostatic cooker and the input portion of an indexing conveyor illustrating the operation of the multi-drop container discharge system.

FIG. 2 is a section of a portion of one of the carriers of the indexing conveyor looking in the direction of arrows 2—2 of FIG. 1.

FIG. 3 is a perspective of a portion of two carriers of the indexing conveyor, with parts cut away and other parts shown in section.

DESCRIPTION OF A PREFERRED EMBODIMENT

The method and apparatus of the present invention comprises an endless conveyor 10 (FIG. 1) of a hydrostatic cooker 11 (only a fragment being shown) such as that disclosed in the cross-referenced Lee U.S. Pat. No. 3,286,619. Containers C such as glass jars, are supported in carriers 12 connected to a pair of endless chains 14 only one being shown) of the endless conveyor 10. The conveyor 10 is trained around small diameter discharge sprockets 18 (only one being shown) secured to a shaft 20 which is driven in a clockwise direction as indicated by the arrow A.

As indicated in FIGS. 1, 2 and 3, each carrier 12 has a wide generally U-shaped, inner portion 22 and a smaller U-shaped outer portion 24 that is connected to the inner portion 22 by a web 26 that is perforated by holes 28 to permit heating and cooling fluids to flow therethrough and control the cooking and thereafter cooling of the containers while within the hydrostatic cooker 11.

Each carrier 12 (FIGS. 2 and 3) is connected to two endless chains 14 (only one being shown) by L-shaped connectors 30 that are rigidly connected to associated links 32 of the chain 14. Similarly, both ends of each carrier are provided with end stops 34 which are welded to arms 36 and are bolted to the associated L-shaped connectors 30 into an end portion of the web 26 of the associated carrier 12.

An indexing conveyor 40 (FIG. 1) includes a pair of intermittently driven endless chains 42 (only one being shown) trained around sprocket 43 keyed to a shaft 44 and having a plurality of truncated V-shaped carrier 45 secured thereto. The indexing conveyor 40 is intermittently driven in timed relation with conveyor 10 in the direction of arrow B by means not shown.

An important feature of the invention is the use of a pair of arcuate support plates 46 (FIG. 1) only one being shown, which includes a pair of arcuate mounting slots 48 for adjustably accepting connectors 50. An arcuate container guide member 52 extends in excess of the full width of the carriers 12 and includes an upper stiffening member 54 and a lower discharge timing plate 56 both of which extend the full width of the carrier 12. The discharge timing plate 56 is supported on the lower end of the arcuate support plates 46 in position to intercept and prevent free fall of each row of containers C', in turn, out of the carriers 12 of the endless conveyor 10. As illustrated in FIG. 1, the distance between the lower end of the discharge timing plate 56 and the lower portion of the container supporting carrier 12 restricts the distance the row of containers C will free fall out of the associated carriers 12.

After the carriers 12 have moved a distance to the left (FIG. 1) greater than the diameter of the container C, the row of containers C will drop free from the conveyor 10. A back-up bar 60 includes a container contacting surface 62, a bottom wall 64 and slotted side wall 66 (only one being shown) for receiving connectors 68 which secures the back-up bar 60 in adjusted position to the side walls of the hydrostatic cooker 11.

As illustrated in FIG. 1, the positioning of the back-up bar 60 is such that the row of containers C" released from the conveyor 10 are initially captured between the container contacting surface 62 and a side wall 45' of a carrier 45 of the indexing conveyor 40 and remains in that position until the indexing conveyor moves the V-shaped carrier wall 45' away from the back-up bar 60 and moves another carrier 45 into position to gently receive the next row of containers.

In operation, rows of frangible containers, such as glass baby food containers, are continuously conveyed through a hydrostatic cooker for sterilization and thereafter cooling of the containers C.

When each row of containers in the carriers 12 of the continuously driven endless conveyor 10 move into their open position as illustrated in FIG. 1, the row to be discharged first gravitates to positions supported between a downstream carrier 12 and the discharge timing plate 56. The discharge timing plate prevents release of the row of containers until the conveyor 10 moves to the left (FIG. 1) to allow the row of containers to pass between the discharge timing plate 56 and the downstream carrier 12.

The row of containers C then gravitate into the position of the row of containers C" (FIG. 1) at which time they are momentarily captured between the container contacting surface 62 and the side wall 45' of the truncated V-shaped carrier 45. The conveyor 40 then indexes the container receiving carrier 45 to the right (FIG. 1) away from the container contacting surface 62 of the back-up bar 60 at which time the row of containers move a short distance fully into the carriers 45.

From the foregoing description, it is apparent that the multi-drop container discharge system of the present invention includes a mechanism for preventing frangible containers from freely falling from a carrier of a first continuously driven conveyor, into a carrier of an intermittently driven conveyor by momentarily restricting the movement out of the first conveyor and momentarily restricting the movement of the containers fully into the second carriers on the second conveyor.

Although the best mode contemplated for carrying out present invention has been herein shown and described, it will be apparent that modification and variation may be made without departing from what is regarded to be the subject matter of the invention.

What is claimed is:

1. An apparatus for preventing damage to a row of frangible containers when dropped from between two adjacent elongated carriers of a continuously driven first endless conveyor of a hydrostatic cooker at a transfer position to a single carrier of a second intermittently driven indexing conveyor at the transfer positions, comprising:
    first restricting means for momentarily preventing release of the row of containers from between said two adjacent carriers of said first conveyor while permitting controlled downward movement prior to releasing the containers from said first conveyor; and
    second restricting means defined by a container contacting surface of a back-up bar and by a wall of one of a plurality of second carriers of said intermittently driven indexing conveyor precluding free fall of the rows of frangible containers directly into associated ones of said second carriers in response to indexing movement of said one second carrier away from said transfer position.

2. An apparatus according to claim 1 wherein said second carriers on said second conveyor are intermittently driven for allowing said row of frangible containers to gently gravitate into one of said intermittently driven second carriers.

3. A multi-drop article discharge system comprising:
    first continuously driven conveying means pivotal about a first shaft and having pivotal article receiving and restraining first carriers thereof for releasably supporting articles for gravitational release therefrom;
    second intermittently driven conveying means pivotal about a second axis of a second shaft forward of and partially positioned below said first conveying means and having a second carrier means thereon for gravitationally receiving articles from said first carrier; and
    means for momentarily and gently terminating gravitational movement of the articles from said first continuously driven conveyor means at least once prior to becoming fully supported in said second carrier means for preventing impact damage to the article,
    said means for momentarily terminating gravitational movement of the article including an article contacting surface of a back-up bar and by a wall of one of a plurality of second carrier means of said intermittently driven indexing conveyor for gently lowering said article into said one of said second carriers in response to indexing movement of said second carrier means away from said transfer position.

4. An apparatus according to claim 3 wherein the article is a glass container.

5. An apparatus according to claim 4 wherein said first conveying means conveys a plurality of filled and sealed glass containers in each of a plurality of said first carriers through a hydrostatic cooker.

6. An apparatus according to claim 1 and additionally comprising:
    an arcuate guide member included in said first restricting means for maintaining said frangible containers in said first carrier when moving around an arcuate path;
    a discharge timing plate included in said first restricting means connected to said hydrostatic cooker in position to momentarily restrict free fall of the frangible containers from said first conveying means; and
    a back-up bar adjustably connected to said hydrostatic cooker and positioned to momentarily maintain the frangible containers from freely falling and becoming fully seated in said second carrier means thereby reducing impact and preventing damage to said filed and sealed frangible containers.

7. An apparatus for gently transferring rows of containers from a pivotable first carrier to a second carrier of a second conveyor, comprising:
    first means for moving each pivotable first carrier into position above said second carrier;
    second means for initially restricting the release of a row of containers from falling from said first carrier directly into said second carriers for precluding free fall of the rows of containers into associated ones of said second carriers, and
    means for again restricting the movement of said rows of containers fully into said second carriers for preventing free fall and damage to the rows of containers when entering said carriers;
    said means for again restricting the movement of said rows of containers fully into said second carriers including restricting means for momentarily terminating gravitational movement of said rows of containers defined by a contacting surface of a back-up bar and by a wall of one of a plurality of second carriers of said intermittently driven indexing conveyor for gently lowering said rows of containers into one of said second carriers in response to indexing movement of said one second carrier away from said transfer position.

8. An apparatus according to claim 7 wherein said first carrier is a carrier of a continuously driven conveyor of a hydrostatic cooker which sterilizes and thereafter cools rows of containers before releasing them from said first carrier of containers before releasing them from said first carrier into said second carrier of said second conveyor.

9. A method of gently transferring rows of containers from a pivotable first carrier on a first continuously driven conveyor to a second carrier on an intermittently driven second conveyor, comprising the steps of:
    moving each pivotal first carrier into position above one of said second carrier;
    deflecting a row of containers from free falling directly into nested position within said single second carrier;
    initially restricting the release of a row of containers from falling from one of said first carriers directly into said second carrier for precluding free fall of the row of containers fully into said second carrier;
    again restricting the movement of said row of containers fully into said second carrier for further preventing free fall and damage to the row of containers when entering said second carrier;
said row of containers being frangible containers;
wherein a plurality of first carriers are supported on a continuously driven conveyor of a hydrostatic cooker which sterilizes and thereafter cools rows of containers before releasing the containers from said first carriers into said second conveyor; and
said second conveyor being an indexing conveyor.

* * * * *